US012562430B2

(12) United States Patent
Ryu et al.

(10) Patent No.: US 12,562,430 B2
(45) Date of Patent: Feb. 24, 2026

(54) BATTERY MODULE, AND BATTERY PACK AND AUTOMOBILE INCLUDING SAME

(71) Applicant: LG ENERGY SOLUTION, LTD., Seoul (KR)

(72) Inventors: Sang-Woo Ryu, Daejeon (KR); Dal-Mo Kang, Daejeon (KR); Yong-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 784 days.

(21) Appl. No.: 17/789,541

(22) PCT Filed: Aug. 25, 2021

(86) PCT No.: PCT/KR2021/011398
§ 371 (c)(1),
(2) Date: Jun. 28, 2022

(87) PCT Pub. No.: WO2022/045783
PCT Pub. Date: Mar. 3, 2022

(65) Prior Publication Data
US 2023/0051278 A1 Feb. 16, 2023

(30) Foreign Application Priority Data
Aug. 26, 2020 (KR) ........................ 10-2020-0108075

(51) Int. Cl.
*H01M 50/383* (2021.01)
*H01M 50/204* (2021.01)
(Continued)

(52) U.S. Cl.
CPC ....... *H01M 50/383* (2021.01); *H01M 50/204* (2021.01); *H01M 50/249* (2021.01);
(Continued)

(58) Field of Classification Search
CPC .. H01M 10/625; H01M 50/20; H01M 50/204; H01M 50/249; H01M 50/271;
(Continued)

(56) References Cited

U.S. PATENT DOCUMENTS 6,278,259 B1 * 8/2001 Kimoto ............... H01M 50/358
320/147
6,936,373 B2 8/2005 Meissner
(Continued)

FOREIGN PATENT DOCUMENTS

| CN | 210897415 U | 6/2020 |
| EP | 3 965 221 A1 | 3/2022 |

(Continued)

OTHER PUBLICATIONS

"Nobuyoshi, JP-2015133266-A—Translated, Jul. 23, 2015" (Year: 2015).*

(Continued)

*Primary Examiner* — Milton I Cano
*Assistant Examiner* — Jesse J Efymow
(74) *Attorney, Agent, or Firm* — Birch, Stewart, Kolasch & Birch, LLP

(57) ABSTRACT

A battery module includes at least one battery cell assembly having at least one battery cell; a module case configured to accommodate the at least one battery cell assembly; and an exhaust housing coupled to the module case to cover the at least one battery cell assembly, the exhaust housing having at least one gas discharge hole for discharging a gas inside the module case and at least one flame leak prevention partition for variably adjusting a length thereof.

20 Claims, 16 Drawing Sheets

(51) Int. Cl.
   *H01M 50/249*     (2021.01)
   *H01M 50/271*     (2021.01)
   *H01M 50/358*     (2021.01)

(52) U.S. Cl.
   CPC ....... *H01M 50/271* (2021.01); *H01M 50/358*
      (2021.01); *H01M 2220/20* (2013.01)

(58) Field of Classification Search
   CPC .... H01M 50/30; H01M 50/35; H01M 50/358;
                  H01M 50/383; H01M 50/394; H01M
                  2200/20; Y02E 60/10
   See application file for complete search history.

(56)                    References Cited

U.S. PATENT DOCUMENTS

| | | | |
|---|---|---|---|
| 8,236,437 B2 | 8/2012 | Kim et al. | |
| 10,205,143 B2 | 2/2019 | Ha et al. | |
| 11,462,799 B2 * | 10/2022 | Ahn ..................... | H01M 50/367 |
| 2011/0097607 A1 | 4/2011 | Park et al. | |
| 2012/0114993 A1 | 5/2012 | Park et al. | |
| 2012/0164490 A1 * | 6/2012 | Itoi ..................... | H01M 50/358 |
| | | | 429/82 |
| 2013/0089763 A1 | 4/2013 | Lee | |
| 2017/0214009 A1 * | 7/2017 | Ha ....................... | H01M 50/264 |
| 2019/0088914 A1 | 3/2019 | Choi et al. | |
| 2019/0118610 A1 * | 4/2019 | Johnston ................ | B60H 1/143 |
| 2019/0173074 A1 | 6/2019 | Ogawa et al. | |
| 2019/0305270 A1 | 10/2019 | Chi et al. | |
| 2019/0355947 A1 | 11/2019 | Chi et al. | |
| 2021/0265700 A1 | 8/2021 | Egashira et al. | |

FOREIGN PATENT DOCUMENTS

| | | | | |
|---|---|---|---|---|
| EP | 4 024 593 | A1 | | 7/2022 |
| EP | 4 087 047 | A1 | | 11/2022 |
| EP | 4 175 041 | A1 | | 5/2023 |
| JP | 2015133266 | A | * | 7/2015 |
| JP | 2018-14294 | A | | 1/2016 |
| JP | 2016-35817 | A | | 3/2016 |
| JP | 2018-62757 | A | | 4/2016 |
| JP | 2016062757 | A | * | 4/2016 |
| JP | 2020-507184 | A | | 3/2020 |
| JP | 2020-514953 | A | | 5/2020 |
| JP | 2015-133268 | A | | 10/2025 |
| KR | 20-2001-0000112 | U | | 1/2001 |
| KR | 10-2008-0041447 | A | | 5/2008 |
| KR | 10-2012-0090027 | A | | 8/2012 |
| KR | 10-1191660-81 | | | 10/2012 |
| KR | 10-2016-0083272 | A | | 7/2016 |
| KR | 10-2016-0132143 | A | | 11/2016 |
| KR | 10-2016-0135538 | A | | 11/2016 |
| KR | 10-2019-0031835 | A | | 3/2019 |
| KR | 10-1998224 | B1 | | 7/2019 |
| KR | 10-2021-0129514 | A | | 10/2021 |
| WO | WO 2008/058859 | A1 | | 5/2008 |
| WO | WO 2020/003800 | A1 | | 1/2020 |
| WO | WO 2022/124636 | A1 | | 6/2022 |

OTHER PUBLICATIONS

"Kobayashi et al., JP-2016062757-A—Translated, Apr. 25, 2016"
(Year: 2016).*
Extended European Search Report for European Application No.
21862080.5, dated Jul. 14, 2023.
International Search Report (PCT/ISA/210) Issued in PCT/KR2021/
011398 mailed on Dec. 22, 2021.

* cited by examiner

455

455

459

457

BATTERY MODULE, AND BATTERY PACK AND AUTOMOBILE INCLUDING SAME

TECHNICAL FIELD

The present disclosure relates to a battery module, and a battery pack and a vehicle including the same.

The present application claims priority to Korean Patent Application No. 10-2020-0108075 filed on Aug. 26, 2020 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

If a fire occurs in battery cells inside a module case that accommodates the battery cells, the battery module is necessary to exhaust only the gas without expelling the flame out of the module case for safety.

However, the conventional battery module generally does not include a structure for discharging only the exhaust gas while preventing flame leak when a fire situation occurs due to thermal runaway of the battery cells.

Therefore, when a fire situation occurs due to the thermal runaway of the battery cells, it is demanded to find a way to prevent flame leak to the outside of the module case and to discharge the exhaust gas out of the module case.

DISCLOSURE

Technical Problem

The present disclosure is directed to providing a battery module, which may prevent a flame leak to the outside of a module case and also discharge an exhaust gas out of the module case when a fire situation occurs due to thermal runaway of battery cells, and a battery pack and a vehicle including the battery module.

Technical Solution

In one aspect of the present disclosure, there is provided a battery module, comprising: at least one battery cell assembly including at least one battery cell; a module case configured to accommodate the at least one battery cell assembly; and an exhaust housing coupled to the module case to cover the at least one battery cell assembly, the exhaust housing having at least one gas discharge hole for discharging a gas inside the module case and at least one flame leak prevention partition, the at least one flame leak prevention partition having a variable length.

The at least one flame leak prevention partition may have a length variable along a width direction of the module case according to a user manipulation.

The at least one flame leak prevention partition may have multi-stage sliding along the width direction.

The exhaust housing may include a housing base configured to cover an upper side of the module case; a pipe unit fixed on the at least one flame leak prevention partition and configured to communicate with the module case and the at least one gas discharge hole; and a housing cover configured to cover the pipe unit and coupled to the housing base, wherein the at least one flame leak prevention partition is fixed to the housing base.

The housing base may have at least one partition insert groove into which the at least one flame leak prevention partition is inserted.

The at least one flame leak prevention partition may be configured to variably perform multi-stage sliding along a width direction of the housing base.

The pipe unit may include a plurality of pipe connectors coupled to the housing cover and the housing base; and a plurality of pipe cylinders configured to communicate with the plurality of pipe connectors and fixed on the at least one flame leak prevention partition.

Each of the plurality of pipe cylinders may include a plurality of cylinder tubes having a predetermined length and coupled to the plurality of pipe connectors; and at least one cylinder grid configured to connect two of the plurality of cylinder tubes to each other.

In addition, the present disclosure provides a battery pack, comprising: at least one battery module according to the above embodiments; and a pack case configured to package the at least one battery module.

Moreover, the present disclosure provides a vehicle, comprising at least one battery pack according to the above embodiment.

The at least one flame leak prevention partition may have telescoping sections.

The exhaust housing may include a housing base configured to cover an upper side of the module case, the housing base having the at least one gas discharge hole and a housing cover configured to cover the housing base, the housing cover having an exhaust hole.

The battery module may have a pipe between the housing base and housing cover, the pipe extending from the at least one gas discharge hole to the exhaust hole.

The battery module may have grooves in a top edge of the at least one flame leak prevention partition, wherein the pipe unit fits within the grooves.

The pipe unit may have a serpentine shape.

The pipe unit may include a plurality of pipe connectors communicating with an interior of the module case through the at least one gas discharge hole and a plurality of pipe cylinders configured to communicate with the plurality of pipe connectors, wherein at least one of the plurality of pipe connectors with an exterior of the module case.

Advantageous Effects

According to various embodiments as described above, it is possible to provide a battery module, which may prevent a flame leak to the outside of a module case and also discharge an exhaust gas out of the module case when a fire situation occurs due to thermal runaway of battery cells, and a battery pack and a vehicle including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
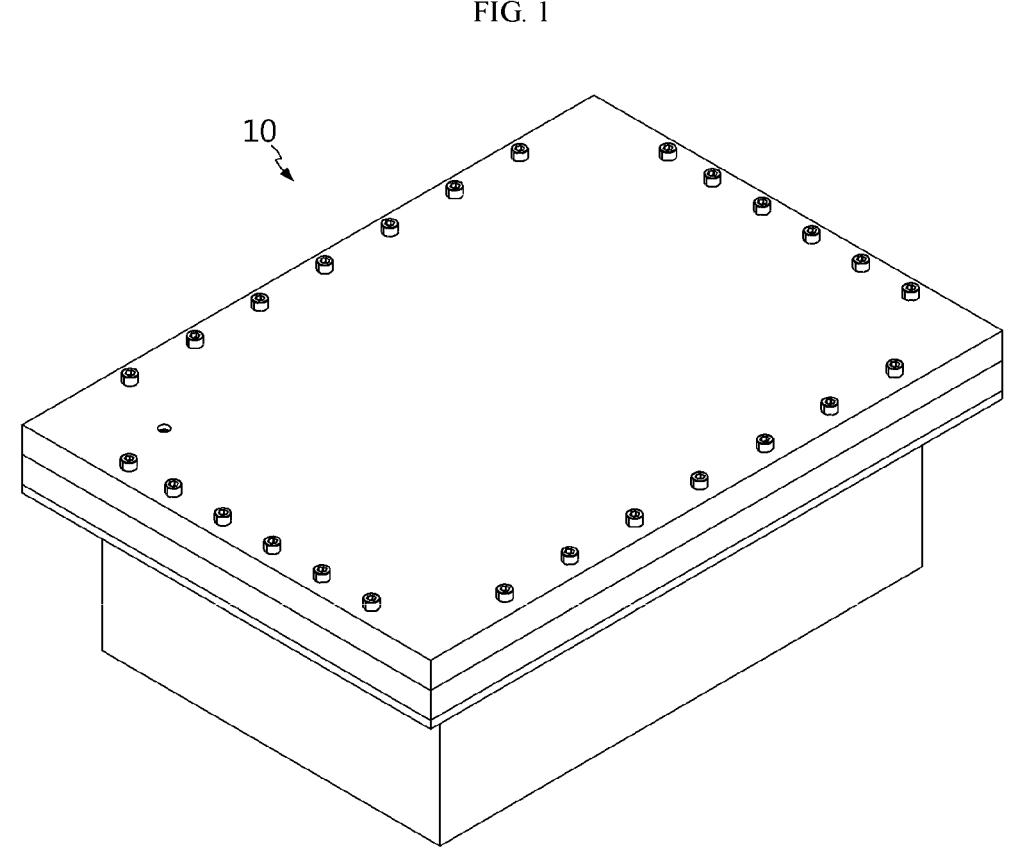
FIG. 1 is a diagram for illustrating a battery module according to an embodiment of the present disclosure.
Figure 2:
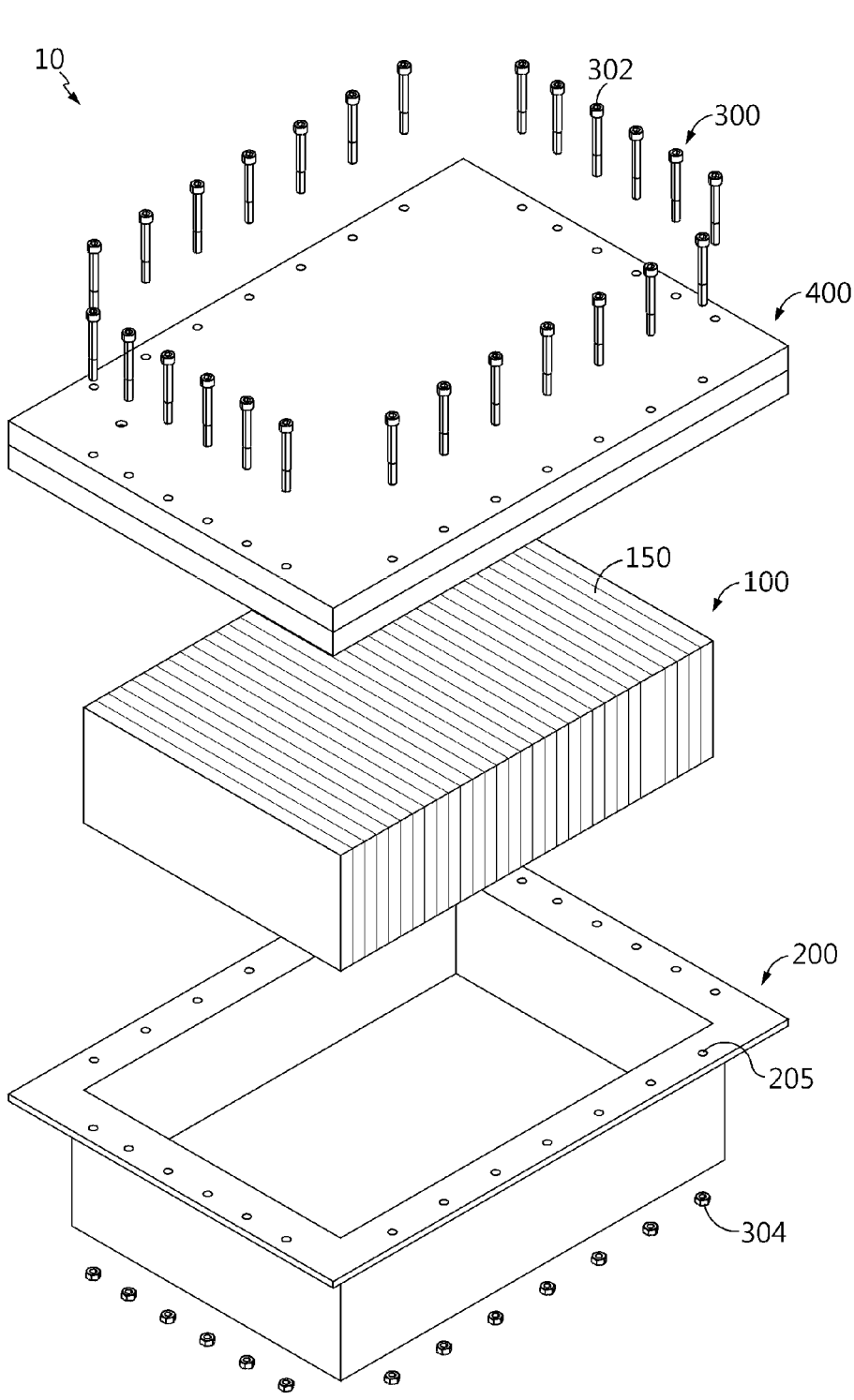
FIG. 2 is an exploded perspective view showing the battery module of FIG. 1.

FIG. 1 is a diagram for illustrating a battery module according to an embodiment of the present disclosure, and FIG. 2 is an exploded perspective view showing the battery module of FIG. 1.

Referring to FIGS. 1 and 2, the battery module 10 may include a battery cell assembly 100, a module case 200, a fastening member 300, and an exhaust housing 400.

At least one battery cell assembly 100 or a plurality of battery cell assemblies 100 may be provided. The battery cell assembly 100 may include one or more battery cells 150. Hereinafter, in this embodiment, it will be described that the battery cell assembly 100 includes a plurality of battery cells 150.

The plurality of battery cells 150 are secondary batteries, and may be provided as pouch-type secondary batteries, rectangular secondary batteries or a cylindrical secondary batteries. Hereinafter, in this embodiment, it will be described that the plurality of battery cells 150 are pouch-type secondary batteries.

The module case 200 may accommodate the at least one battery cell assembly 100. To this end, an accommodation space for accommodating the at least one battery cell assembly 100 may be provided in the module case 200.

The module case 200 may have a plurality of fastening holes 205 for coupling with the exhaust housing 400, explained later. The plurality of fastening holes 205 may be provided to be spaced apart from each other by a predetermined distance along an edge of the module case 200.

The fastening member 300 may connect the module case 200 and the exhaust housing 400, explained later, to each other. The fastening member 300 may be provided in plural.

The plurality of fastening members 300 may include a plurality of fastening bolts 302 and a plurality of fastening nuts 304.

The plurality of fastening bolts 302 may pass through the exhaust housing 400, explained later, and the fastening holes 205 of the module case 200 and be fastened with the fastening nuts 304, respectively.

When a fire situation occurs inside the module case 200, the exhaust housing 400 may prevent flame generated by the fire from being discharged to the outside of the module case 200 and discharge a gas out of the module case 200. Since the battery module 10 according to this embodiment may discharge only the gas to the outside through the exhaust housing 400 while suppressing the flame emission when the fire situation occurs, it is possible to prevent a greater damage from being caused by the fire situation in advance.

In the following, the exhaust housing 400 will be described in more detail.

Figure 3:
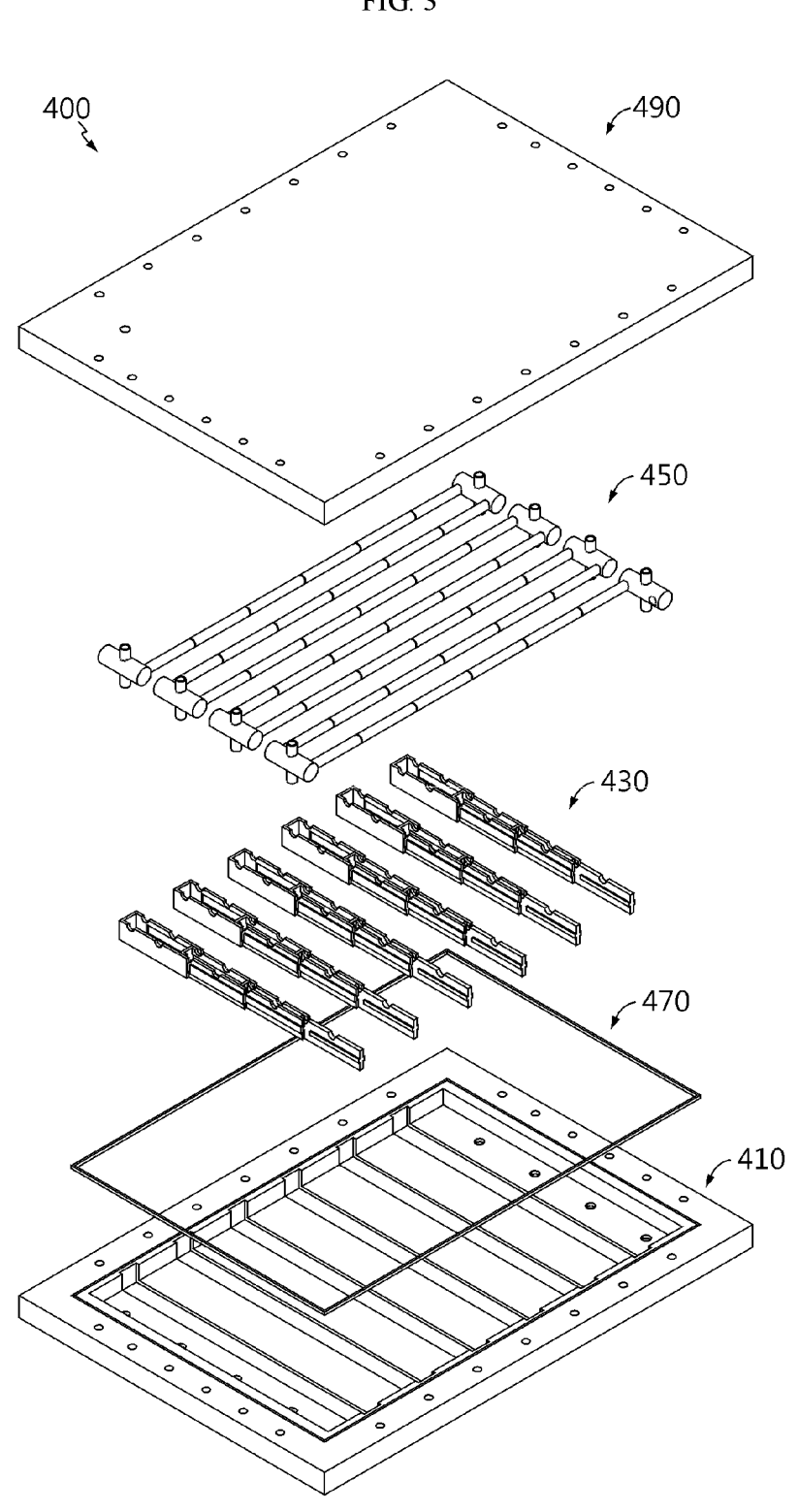
FIG. 3 is an exploded perspective view showing an exhaust housing of the battery module of FIG. 2.

FIG. 3 is an exploded perspective view showing the exhaust housing of the battery module of FIG. 2.

Referring to FIG. 3, the exhaust housing 400 is coupled to the module case 200 (see FIG. 2) to cover the at least one battery cell assembly 100 (see FIG. 2). Also, the exhaust housing 400 may include at least one gas discharge hole 416 for discharging the gas inside the module case 200, and at least one flame leak prevention partition 430 capable of variably adjusting the length thereof.

Hereinafter, the structure of the exhaust housing 400 will be described in more detail.

Figure 4:
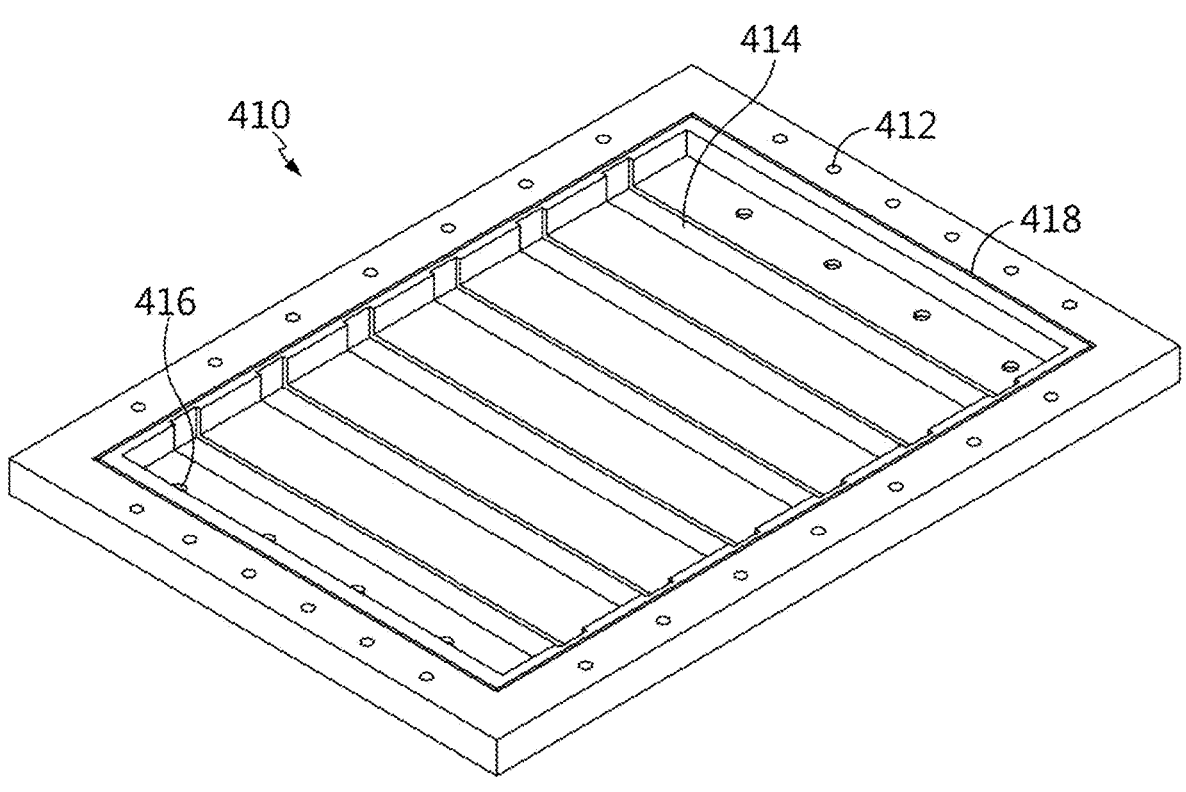
FIG. 4 is a diagram for illustrating a housing base of the exhaust housing of FIG. 3.

FIG. 4 is a diagram for illustrating a housing base of the exhaust housing of FIG. 3.

Referring to FIG. 4, the housing base 410 may cover an upper side of the module case 200 (see FIG. 2). The housing base 410 may include a case fastening hole 412, a partition insert groove 414, the gas discharge hole 416, and a sealing member insert groove 418.

The case fastening hole 412 may be provided in plural, and the plurality of case fastening holes 412 may be arranged to be spaced apart from each other by a predetermined distance along the edge of the housing base 410. The fastening bolts 302 of the fastening member 300 may penetrate the plurality of case fastening holes 412.

The partition insert groove 414 is provided on an upper side of the bottom of the housing base 410, and may be formed in a predetermined length along the width direction of the housing base 410. The flame leak prevention partition 430, explained later, may be inserted into the partition insert groove 414.

The partition insert groove 414 may be provided in plural. The plurality of partitions insert grooves 414 may be disposed to be spaced apart from each other by a predetermined distance along the length direction of the housing base 410.

The gas discharge hole 416 may be provided in the bottom of the housing base 410. The gas discharge hole 416 may be provided to communicate with the inside of the module case 200 (see FIG. 2).

The gas discharge hole 416 may be provided in plural. The plurality of gas discharge holes 416 may be provided near both edges of the bottom of the housing base 410.

The sealing member insert groove 418 may be provided at an edge of the upper surface of the housing base 410. The sealing member insert groove 418 may be provided between the plurality of case fastening holes 412 and the partition insert groove 414.

Figure 5:
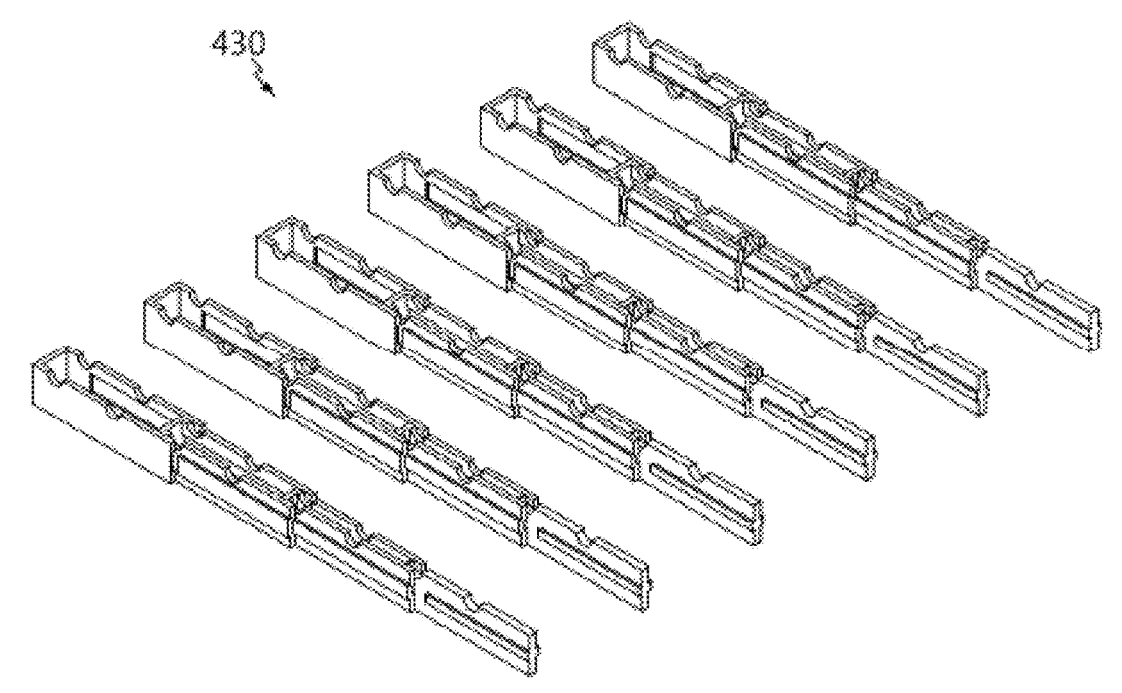
FIG. 5 is a diagram for illustrating a flame leak prevention partition of the exhaust housing of FIG. 3.
Figure 6:
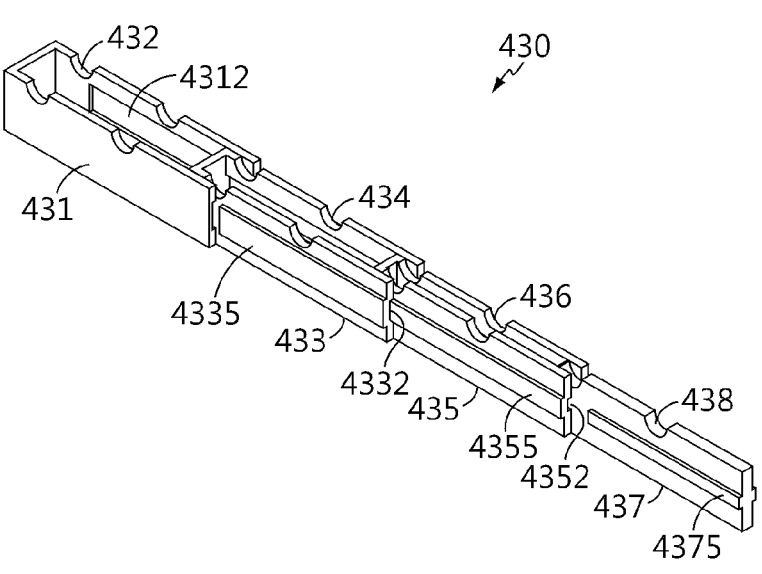
FIGS. 6 and 7 are diagrams for illustrating a sliding operation of the flame leak prevention partition of FIG. 5.
Figure 7:
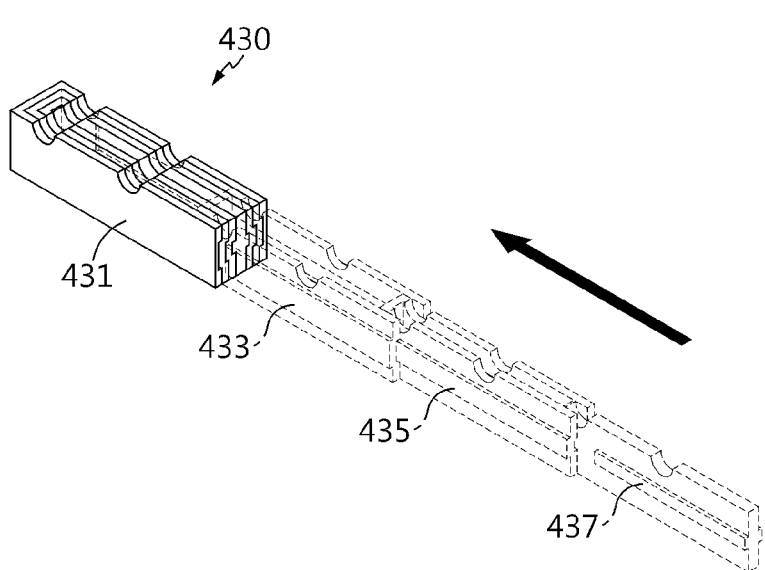

FIG. 5 is a diagram for illustrating a flame leak prevention partition of the exhaust housing of FIG. 3, and FIGS. 6 and 7 are diagrams for illustrating a sliding operation of the flame leak prevention partition of FIG. 5.

Referring to FIGS. 5 to 7, the flame leak prevention partition 430 may be provided in plural. The plurality of flame leak prevention partitions 430 may secure a predetermined rigidity while acting as a bead, thereby securing rigidity to suppress the explosive force when a fire situation occurs.

In addition, the plurality of flame leak prevention partitions 430 have a predetermined height, and serve as the beads when a fire situation occurs to minimize flame propagation to the surrounding area.

The flame leak prevention partition 430 may be provided to have a length variable along the width direction of the module case 200 (see FIG. 2) according to a user manipulation. Specifically, the flame leak prevention partition 430 may be provided to perform multi-stage sliding along the width direction. More specifically, the flame leak prevention partition 430 may be provided to variably perform multi-stage sliding along the width direction of the housing base 410.

The flame leak prevention partition 430 may be fixed to the housing base 410. Specifically, the flame leak prevention partition 430 may be inserted into and mounted to the partition insert groove 414 of the housing base 410.

The flame leak prevention partition 430 may include a plurality of partitions 431, 433, 435, 437 for the multi-stage sliding.

The plurality of partitions 431, 433, 435, and 437 may include a first partition 431, a second partition 433, a third partition 435, and a fourth partition 437.

When mounted to the housing base 410, the first partition 431 may be disposed at one end of the housing base 410 in the width direction. A plurality of pipe storage boxes 432 may be formed at an upper side of the first partition 431. A pipe cylinder 455 of a pipe unit 450, explained later, may be fixed to the plurality of pipe storage boxes 432.

The first partition 431 may have a sliding groove 4312 for guiding the sliding of the second partition 433, explained later. The sliding groove 4312 is provided at both sides of the inner surface of the first partition 431, and may guide variable sliding of the second partition 433, explained later, along the width direction of the housing base 410.

The second partition 433 may be mounted to the first partition 431 to be slidable from the first partition 431. The plurality of pipe storage boxes 434 may be formed at an upper side of the second partition 433. The pipe cylinder 455 of the pipe unit 450, explained later, may be fixed to the plurality of pipe storage boxes 434.

The second partition 433 may include a sliding groove 4332 and a sliding protrusion 4335.

The sliding groove 4332 may guide the sliding of the third partition 435, explained later. The sliding groove 4332 is provided at both sides of the inner surface of the second partition 433, and may guide variable sliding of the third partition 435, explained later, along the width direction of the housing base 410.

The sliding protrusion 4335 may be provided at both sides of the outer surface of the second partition 433. The sliding protrusion 4335 of the second partition 433 may be slidably mounted to the sliding groove 4312 of the first partition 431.

The third partition 435 may be mounted to the second partition 433 to be slidable from the second partition 433. A plurality of pipe storage boxes 436 may be formed at an upper side of the third partition 435. A pipe cylinder 455 of a pipe unit 450, explained later, may be fixed to the plurality of pipe storage boxes 436.

The third partition 435 may include a sliding groove 4352 and a sliding protrusion 4355.

The sliding groove 4352 may guide the sliding of the fourth partition 437, explained later. The sliding groove 4352 is provided at both sides of the inner surface of the third partition 435, and may guide variable sliding of the fourth partition 437, explained later, along the width direction of the housing base 410.

The sliding protrusion 4355 may be provided at both sides of the outer surface of the third partition 435. The sliding protrusion 4355 of the third partition 435 may be slidably mounted to the sliding groove 4332 of the second partition 433.

The fourth partition 437 may be mounted to the third partition 435 to be slidable from the third partition 435. At least one pipe storage box 438 may be formed at an upper side of the fourth partition 437. A pipe cylinder 455 of a pipe unit 450, explained later, may be fixed to the at least one pipe storage box 438.

The fourth partition 437 may include a sliding protrusion 4375.

The sliding protrusion 4375 may be provided at both sides of the outer surface of the fourth partition 437. The sliding protrusion 4375 of the fourth partition 437 may be slidably mounted to the sliding groove 4352 of the third partition 435.

The sliding operation of the first partition 431 to the fourth partition 437 will be described as follows. For example, the fourth partition 437 may be inserted into the third partition 435 by sliding toward the third partition 435 through a user manipulation or the like. In this case, a three-stage partition structure of the first partition 431 to the third partition 435 may be formed.

Also, for example, the third partition 435 may be inserted into the second partition 433 by sliding toward the second partition 433 through a user manipulation or the like. In this case, a two-stage partition structure of the first partition 431 and the second partition 433 may be formed.

Moreover, for example, the second partition 433 may be inserted into the first partition 431 by sliding toward the first partition 431 through a user manipulation or the like. In this case, a one-stage partition structure in which the second to fourth partitions 433 to 437 are accommodated in the first partition 431 may be formed.

In this way, the flame leak prevention partition 430 according to this embodiment may form a partition structure of four stages in total of, from 1 stage to 4 stage, through the multi-stage sliding structure, and thus the length of the flame leak prevention partition 430 may be variably adjusted. Through this variable flame leak prevention partition struc- ture, in this embodiment, according to the module width of the battery module 10, the flame leak prevention partition 430 may be installed in a customized form, so the module compatibility of the exhaust housing 400 may be increased.

Figure 8:
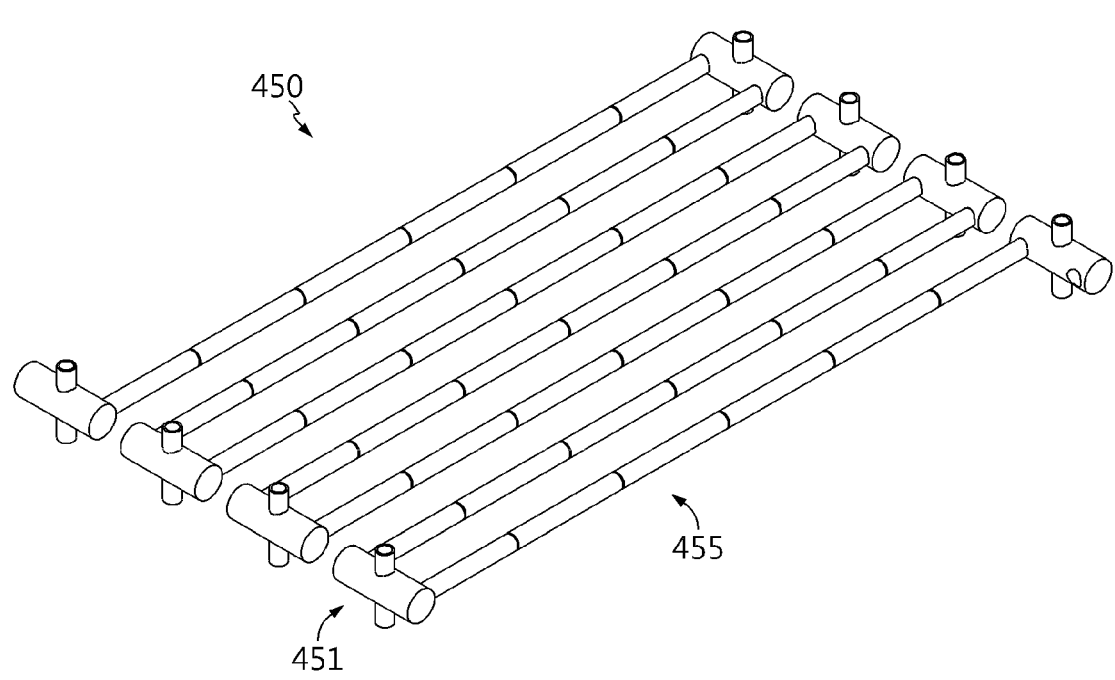
FIG. 8 is a diagram for illustrating a pipe unit of the exhaust housing of FIG. 3.
Figure 9:
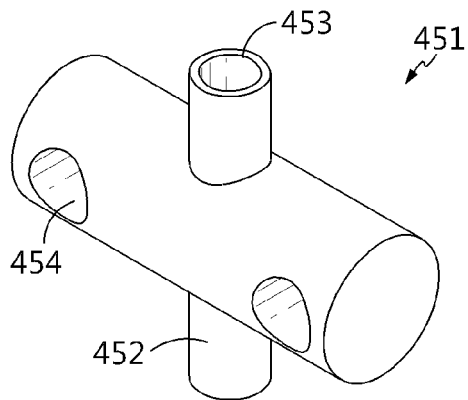
FIG. 9 is a diagram for illustrating a pipe connector of the pipe unit of FIG. 8.
Figure 10:
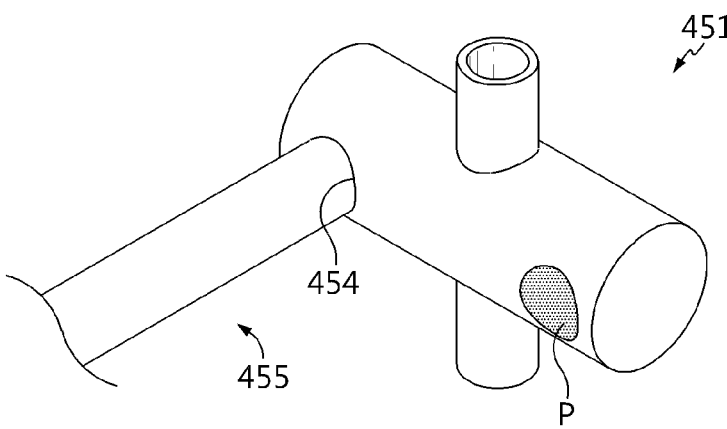
FIGS. 10 and 11 are diagrams for illustrating a connection between the pipe connector of FIG. 9 and a pipe cylinder.
Figure 11:
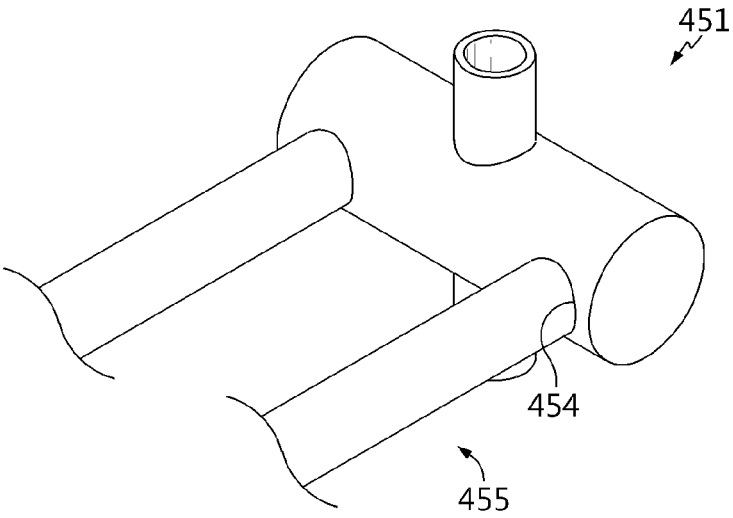
Figure 12:
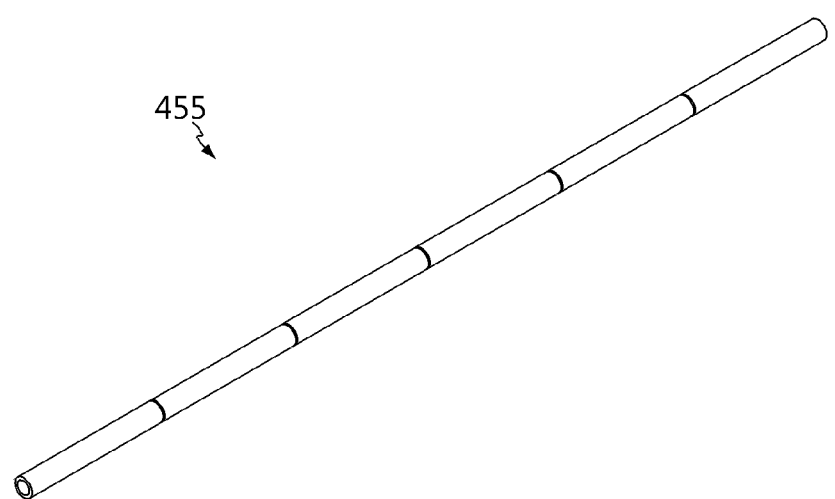
FIG. 12 is a diagram for illustrating the pipe cylinder of the pipe unit of FIG. 8.
Figure 13:
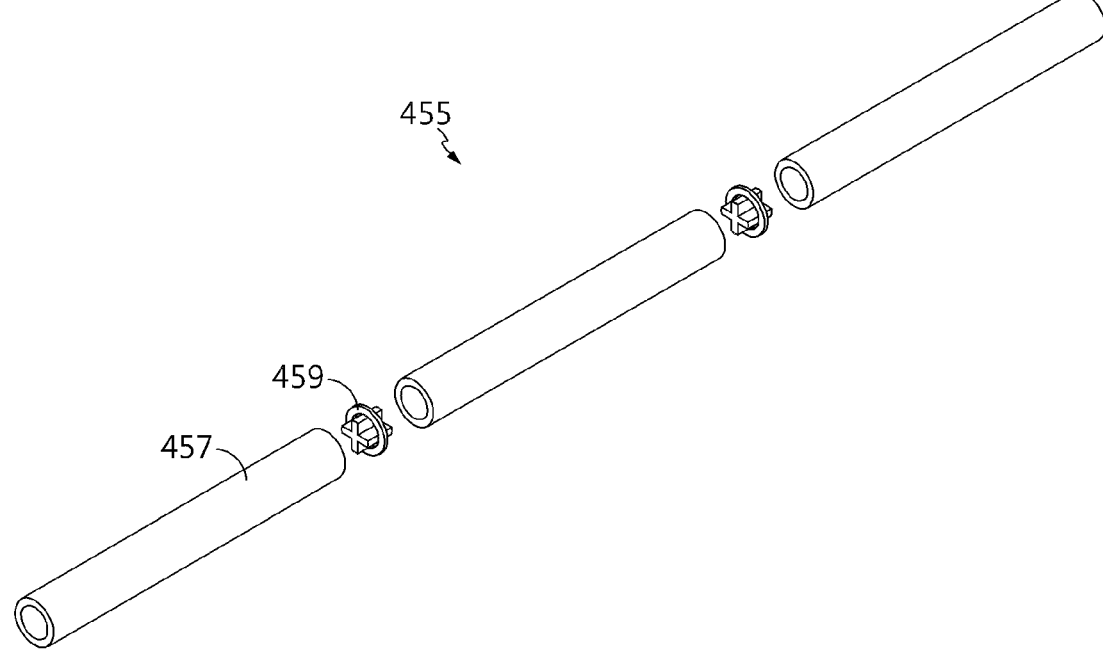
FIG. 13 is an exploded perspective view showing the pipe cylinder of FIG. 12.
Figure 14:
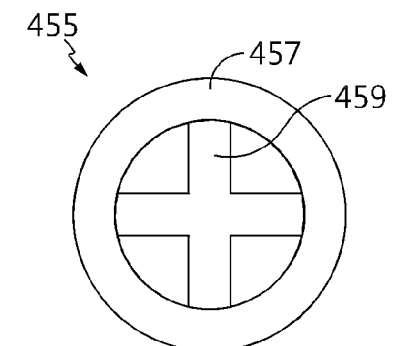
FIG. 14 is a sectional view showing the pipe cylinder of FIG. 13.

FIG. 8 is a diagram for illustrating a pipe unit of the exhaust housing of FIG. 3, FIG. 9 is a diagram for illustrat- ing a pipe connector of the pipe unit of FIG. 8, FIGS. 10 and 11 are diagrams for illustrating a connection between the pipe connector of FIG. 9 and a pipe cylinder, FIG. 12 is a diagram for illustrating the pipe cylinder of the pipe unit of FIG. 8, FIG. 13 is an exploded perspective view showing the pipe cylinder of FIG. 12, and FIG. 14 is a sectional view showing the pipe cylinder of FIG. 13.

Referring to FIGS. 8 to 14, the pipe unit 450 may be fixed on the at least one flame leak prevention partition 430 and communicate with the module case 200 and the at least one gas discharge hole 416.

The pipe unit 450 may include a plurality of pipe con- nectors 451 and a plurality of pipe cylinders 455.

The plurality of pipe connectors 451 may be coupled to a housing cover 490, explained later, and the housing base 410. Specifically, the plurality of pipe connectors 451 may be disposed at the upper side of the plurality of gas discharge holes 416 of the housing base 410.

Each of the plurality of pipe connectors 451 may include a gas discharge hole connection portion 452, an exhaust hole connection portion 453 and a cylinder connection portion 454.

The gas discharge hole connection portion 452 may be provided at a lower side of the pipe connector 451 and be mounted in communication with the plurality of gas dis- charge holes 416 of the housing base 410.

The gas discharge hole connection portion 452 may guide the gas inside the module case 200 to the inside of the pipe connector 451. Here, according to a preset intake and exhaust directions of the gas, gas discharge hole connection portions 452 other than at least one gas discharge hole connection portion 452 among the plurality of pipe connec- tors 451 may be sealed using a packing member P.

The packing member P may be made of a rubber material or the like, and the gas discharge hole connection portion 452 may be inserted therein to seal the hole or the like of the gas discharge hole connection portion 452.

The exhaust hole connection portion 453 may be provided at an upper side of the pipe connector 451 and be provided at a side opposite to the gas discharge hole connection portion 452. Among the plurality of pipe connectors 451, at least one exhaust hole connection portion 453 may be mounted in communication with an exhaust hole 495 of the housing cover 490, explained later.

Here, according to the preset intake and exhaust direc- tions of the gas, exhaust hole connection portions 453 other than at least one exhaust hole connection portion 453 among the plurality of pipe connectors 451 may be sealed using the packing member P.

The cylinder connection portion 454 may be provided in a pair. The pair of cylinder connection portions 454 may be connected to communicate with one or more cylinder tubes 457 of the pipe cylinder 455, explained later, according to the preset intake and exhaust directions of the gas. Accord- ing to the preset intake and exhaust directions of the gas, a cylinder connection portion 454 that is not connected to the cylinder tube 457, explained later, may be sealed using the packing member P.

The plurality of pipe cylinders 455 may communicate with the plurality of pipe connectors 451 and be fixed on the at least one flame leak prevention partition 430. Specifically, the plurality of pipe cylinders 455 may be connected in communication with the cylinder connection portion 454.

The plurality of pipe cylinders 455 may include a plurality of cylinder tubes 457 and at least one cylinder grid 459.

The plurality of cylinder tubes 457 are formed in a predetermined length, and may be coupled with the plurality of pipe connectors 451. Specifically, the plurality of cylinder tubes 457 may be connected in communication with the cylinder connection portion 454.

The at least one cylinder grid 459 is for connecting the plurality of cylinder tubes 457 to each other, and may be mounted between two facing cylinder tubes 457.

The at least one cylinder grid 459 has a sectional structure of a grid shape, and may connect two cylinder tubes 457 to each other. In addition, the at least one cylinder grid 459 may function as a guide for preventing flame leak.

The sealing member 470 (see FIG. 3) is for sealing the inside of the exhaust housing 400, and may be inserted into and mounted to the sealing member insert groove 418 of the housing base 410.

Figure 15:
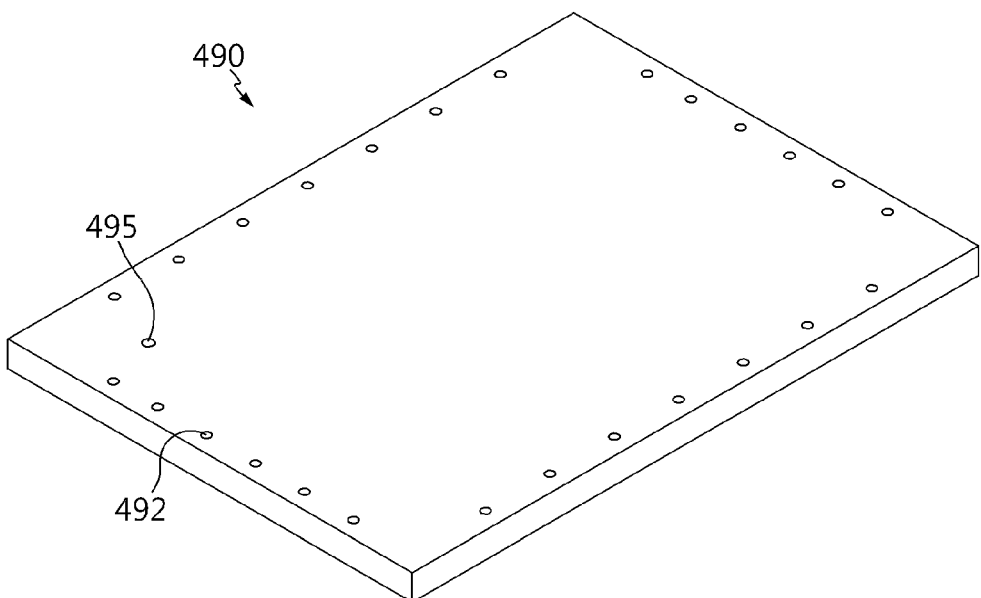
FIG. 15 is a diagram for illustrating a housing cover of the exhaust housing of FIG. 3.

FIG. 15 is a diagram for illustrating a housing cover of the exhaust housing of FIG. 3.

Referring to FIG. 15, the housing cover 490 covers the pipe unit 450 and may be coupled with the housing base 410.

The housing cover 490 may include a case fastening hole 492 and an exhaust hole 495.

The case fastening hole 492 may be provided in plural. The plurality of case fastening holes 492 are formed along the edge of the housing cover 490 and may be spaced apart from each other by a predetermined distance. The fastening bolts 302 of the fastening member 300 may penetrate the plurality of case fastening holes 492.

The exhaust hole 495 is formed at an upper side of the housing cover 410, and may be connected in communication with the exhaust hole connection portion 453 (see FIG. 9) of the pipe connector 451 (see FIG. 9) of the pipe unit 450. The gas flowing along the pipe unit 450 may be discharged out of the exhaust housing 400 through the exhaust hole 495.

Hereinafter, the gas discharge when a fire occurs due to a fire situation of the battery module 10 according to this embodiment will be described in more detail.

Figure 16:
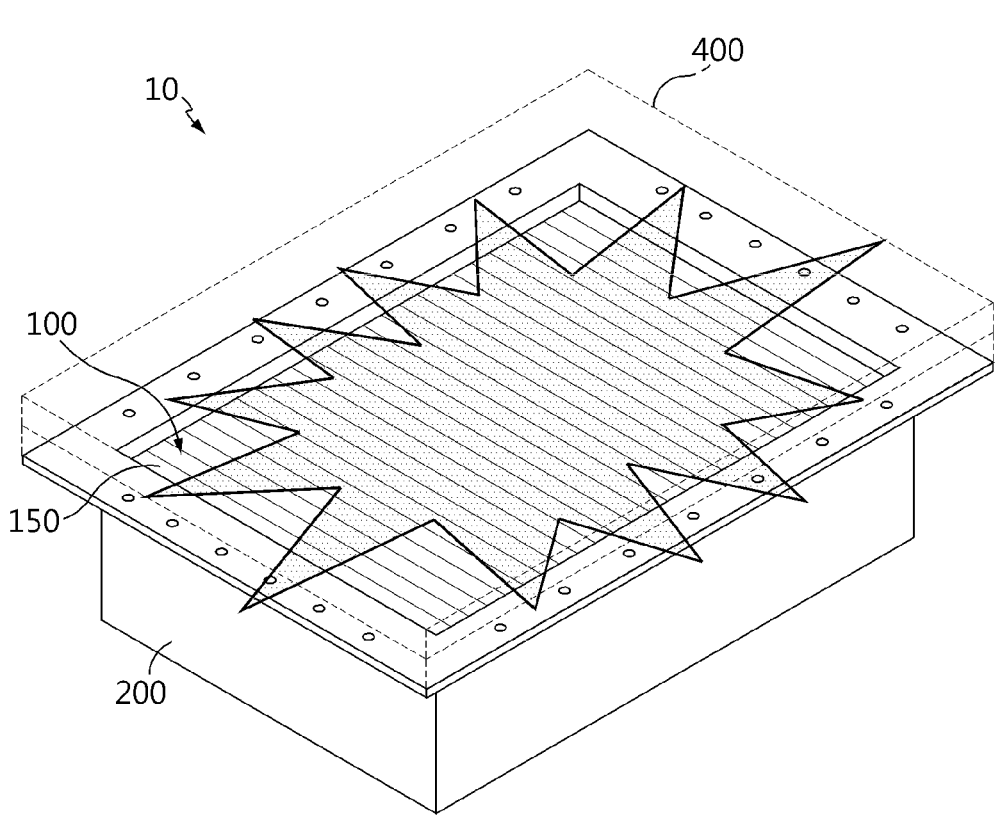
FIGS. 16 to 18 are diagrams for illustrating gas discharge when a fire occurs due to a fire situation of the battery module of FIG. 1.
Figure 17:
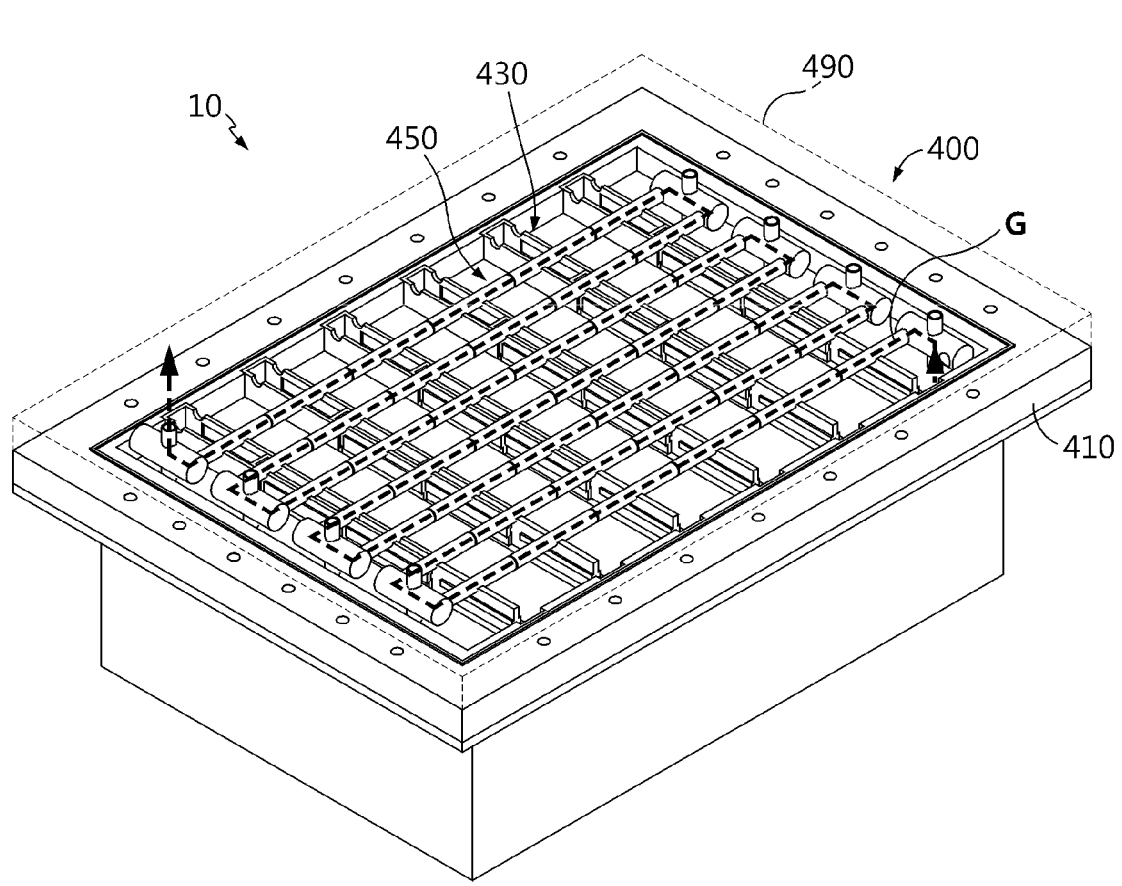
Figure 18:
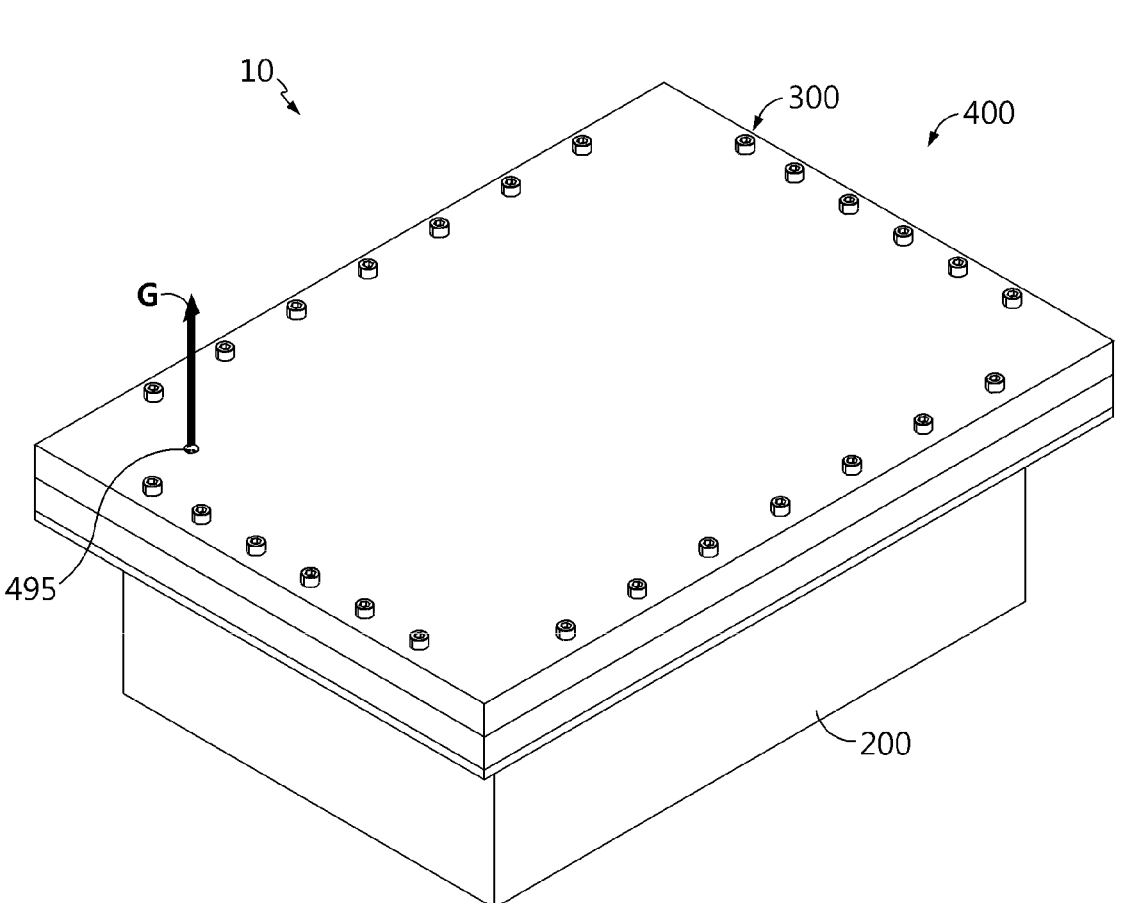

FIGS. 16 to 18 are diagrams for illustrating gas discharge when a fire occurs due to a fire situation of the battery module of FIG. 1.

Referring to FIGS. 16 to 18, when an abnormal situation such as thermal runaway occurs in at least one of the battery cells 150 of the battery cell assembly 10 of the battery module 10, a fire may occur in at least one battery cell 150. When a fire occurs as above, in order to prevent a larger secondary damage, it is necessary to emit only gas out of the module case 200 while preventing the leakage of flame or the like out of the module case 200.

In this embodiment, when the fire situation occurs, it is possible to prevent the flame generated inside the module case 200 from being leaked by means of the exhaust housing 400. In addition, the gas G generated inside the module case 200 may flow along a exhaust path (indicated by a dotted line in FIG. 17) of the pipe unit 450 of the exhaust housing 400 and then be quickly discharged out of the module case 200 through the exhaust hole 495 (see FIG. 18) of the housing cover 490.

As such, the battery module 10 according to this embodiment may discharge the gas G out of the module case 200 more quickly while suppressing the emission of the flame by means of the exhaust housing 400 when the fire situation occurs, thereby minimizing a secondary damage that may be caused by the fire.

Hereinafter, exhaust housings according to various embodiments of the present disclosure will be described in more detail.

Figure 19:
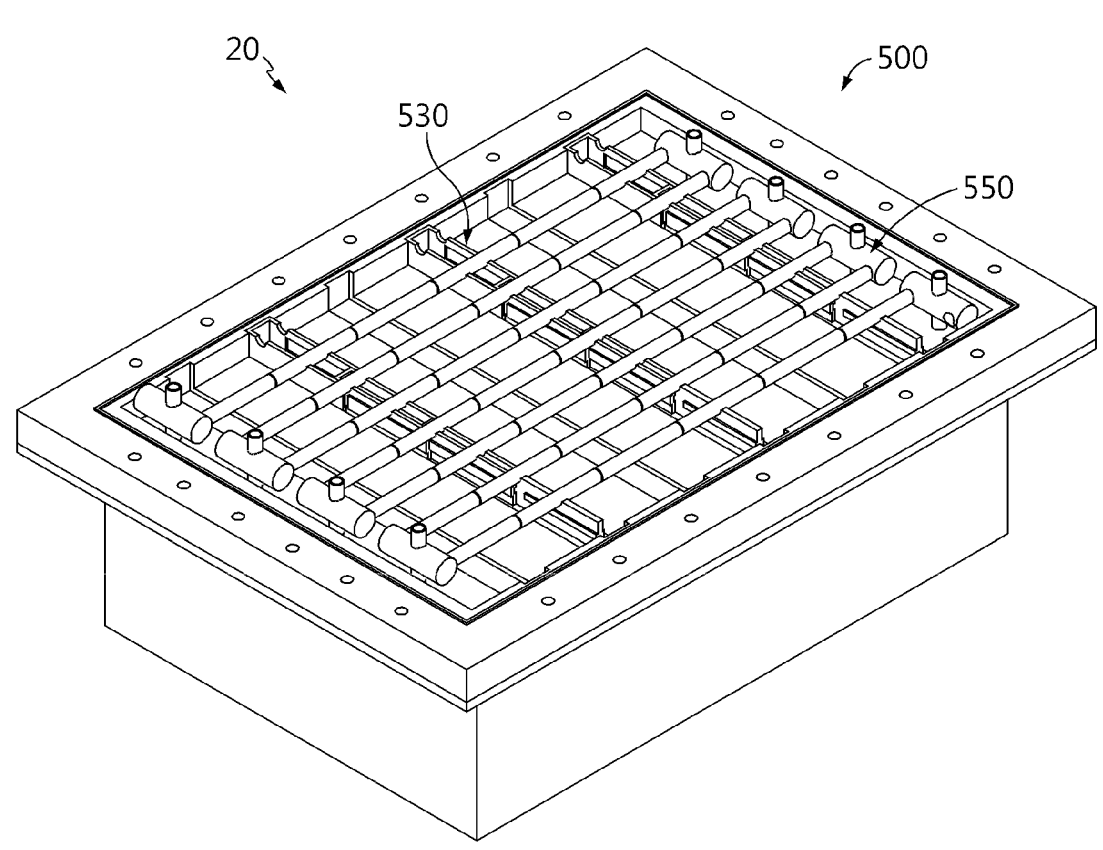
FIGS. 19 to 21 are diagrams for illustrating exhaust housings according to various embodiments of the present disclosure.
Figure 20:
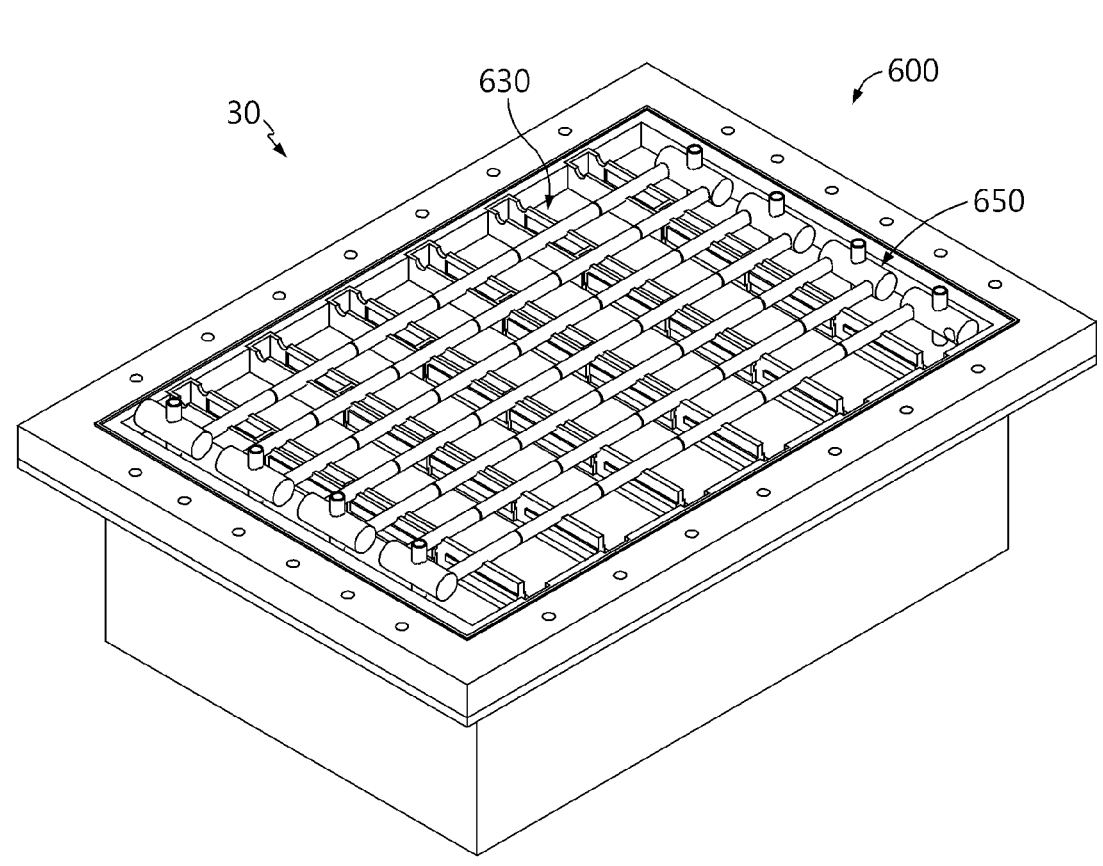
Figure 21:
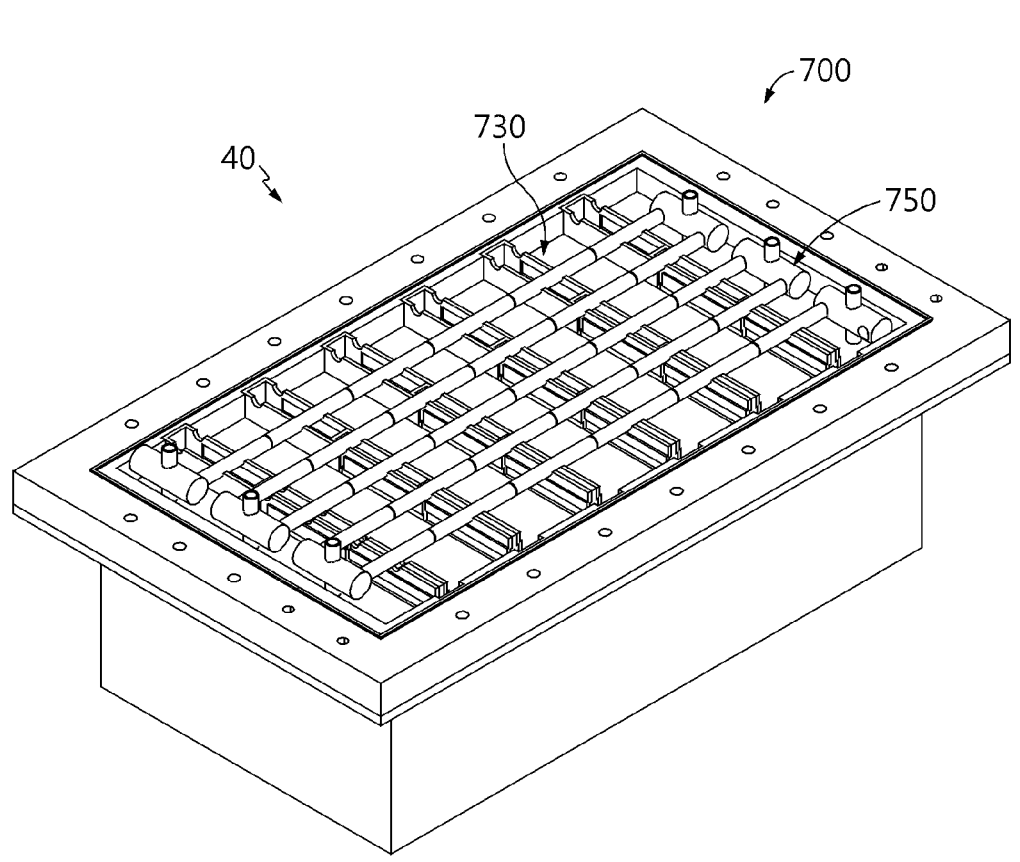

FIGS. 19 to 21 are diagrams for illustrating exhaust housings according to various embodiments of the present disclosure.

Referring to FIG. 19, in the battery module 20, when the explosive force is small, for example, when the capacity of the battery cells is relatively small, the explosion may be suppressed even with low rigidity, so a manufacturer or the like may reduce the number of flame leak prevention partitions 530 supporting the pipe unit 550 in the exhaust housing 500. Accordingly, the battery module 20 according to this embodiment may secure cost competitiveness by reducing costs as much as the reduced number of the flame leak prevention partitions 430.

Referring to FIG. 20, in the battery module 30, when the explosive force is large, for example, when the capacity of the battery cells is relatively large, high rigidity is required, so the manufacturer or the like may further increase the number of flame leak prevention partitions 630 supporting the pipe unit 650 in the exhaust housing 600.

Referring to FIG. 21, in the battery module 40, when the width of the battery module 40 is narrow, the manufacturer or the like may reduce the length of the flame leak prevention partition 730 of the exhaust housing 700 supporting the pipe unit 750. That is, the flame leak prevention partition 730 may be modified to a three-stage partition type. This is only an example, and it is also possible to modify the flame leak prevention partition 730 to a two-stage or one-stage partition type, and it is also possible to increase the number of partitions to five or more according to the design or the like.

As such, in this embodiment, in the exhaust housing 400, 500, 600, 700, the number of flame leak prevention partitions 430, 530, 630, 730 of the exhaust housings 400, 500, 600, 700 may be reduced according to the width size or rigidity of the battery module 10, 20, 30, 40, or the length thereof may be varied. Accordingly, it is possible to implement an exhaust housing structure with high extensibility and compatibility.

Figure 22:
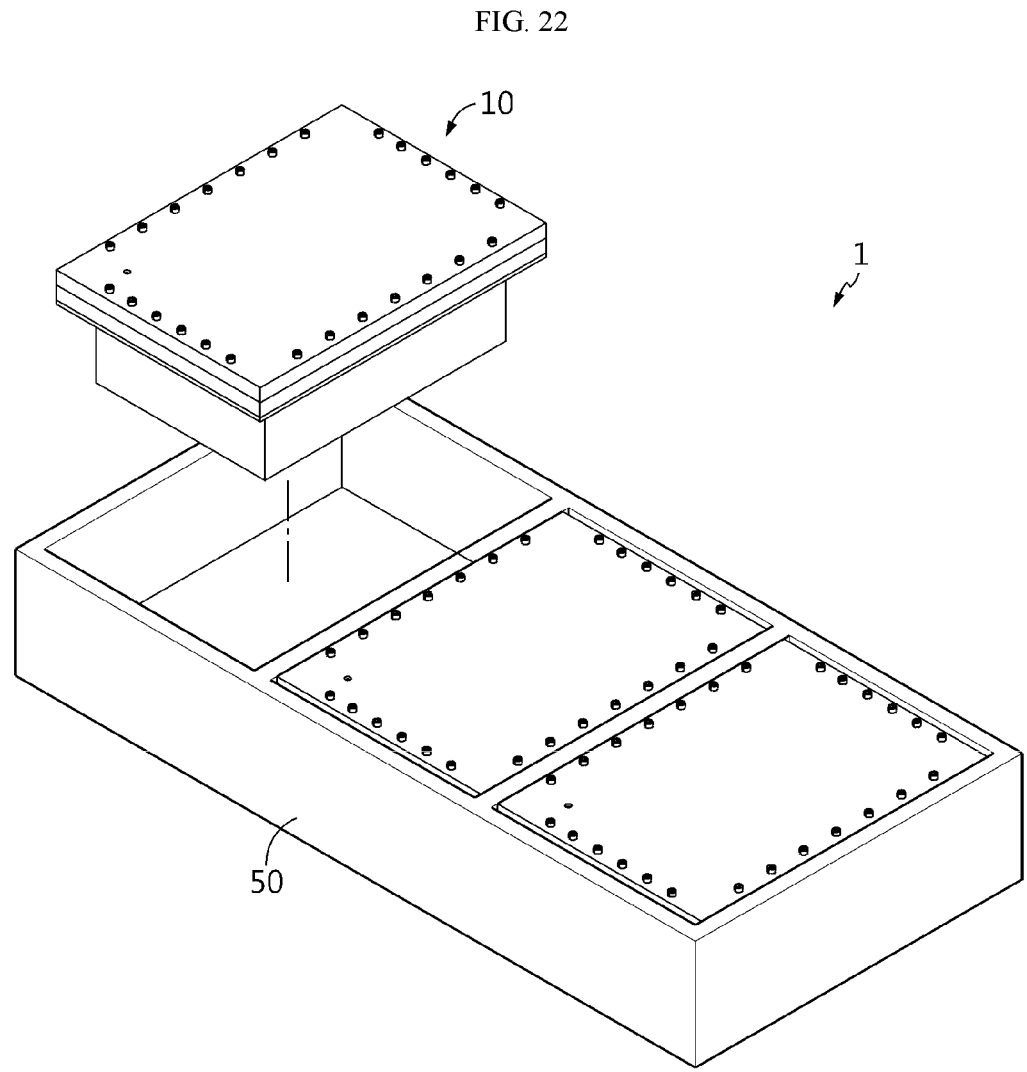
FIG. 22 is a diagram for illustrating a battery pack according to an embodiment of the present disclosure.
Figure 23:
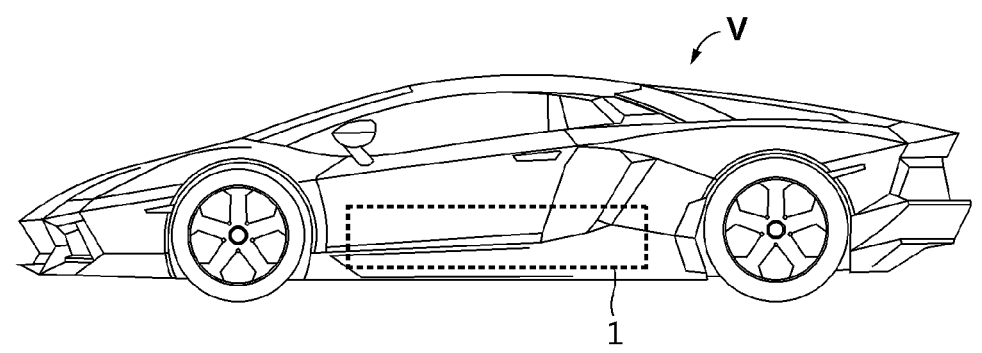
FIG. 23 is a diagram for illustrating a vehicle according to an embodiment of the present disclosure.

FIG. 22 is a diagram for illustrating a battery pack according to an embodiment of the present disclosure, and FIG. 23 is a diagram for illustrating a vehicle according to an embodiment of the present disclosure.

Referring to FIGS. 22 and 23, a battery pack 1 may include at least one battery module 10 according to the former embodiment and a pack case 50 for packaging the at least one battery module 10. Moreover, in addition to the battery module 10, the battery modules 20 to 40 of the former embodiments may also be included.

The battery pack 1 may be provided to a vehicle as a fuel source of a vehicle V. As an example, the battery pack 1 may be provided to an electric vehicle, a hybrid electric vehicle, and various other-type vehicles V capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as a vehicle, which have the battery pack 1, include the battery module 10 to 40 as described above, and thus it is possible to implement a battery pack 1 having all the advantages of the battery module 10 to 40 described above, or devices, instruments, facilities or the like such as a vehicle V, which have the battery pack 1.

According to various embodiments as described above, it is possible to provide a battery module 10, 20, 30, 40, which may prevent a flame leak to the outside of a module case 200 and also discharge an exhaust gas G out of the module case 200 when a fire situation occurs due to thermal runaway of battery cells 100, and a battery pack 1 and a vehicle V including the battery module 10, 20, 30, 40.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
    at least one battery cell assembly including at least one battery cell;
    a module case configured to accommodate the at least one battery cell assembly; and
    an exhaust housing coupled to the module case to cover the at least one battery cell assembly, the exhaust housing comprising:
    a housing base configured to cover an upper side of the module case,
    at least one gas discharge hole in the housing base for discharging a gas inside the module case; and
    at least one flame leak prevention partition having a longitudinal direction extending across a top surface of the housing base, the at least one flame leak prevention partition having a variable length along the longitudinal direction.

2. The battery module according to claim 1, wherein the at least one flame leak prevention partition has a length variable along a width direction of the module case according to a user manipulation.

3. The battery module according to claim 2, wherein the at least one flame leak prevention partition has multi-stage sliding along the width direction.

4. The battery module according to claim 1, wherein the exhaust housing includes:
    a pipe unit fixed on the at least one flame leak prevention partition and configured to communicate with the module case and the at least one gas discharge hole; and a housing cover configured to cover the pipe unit and coupled to the housing base, wherein the at least one flame leak prevention partition is fixed to the housing base.

5. The battery module according to claim 4, further comprising grooves in a top edge of the at least one flame leak prevention partition, wherein the pipe unit fits within the grooves.

6. The battery module according to claim 4, wherein the pipe unit has a serpentine shape.

7. The battery module according to claim 4, wherein pipe unit includes:

a plurality of pipe connectors communicating with an interior of the module case through the at least one gas discharge hole; and a plurality of pipe cylinders configured to communicate with the plurality of pipe connectors, wherein at least one of the plurality of pipe connectors communicates with an exterior of the module case.

8. The battery module according to claim 4, wherein the top surface of the housing base has at least one partition insert groove into which the at least one flame leak prevention partition is inserted.

9. The battery module according to claim 4, wherein the at least one flame leak prevention partition is configured to variably perform multi-stage sliding along a width direction of the housing base.

10. The battery module according to claim 4, wherein the pipe unit includes:

a plurality of pipe connectors coupled to the housing cover and the housing base; and a plurality of pipe cylinders configured to communicate with the plurality of pipe connectors and fixed on the at least one flame leak prevention partition.

11. The battery module according to claim 10, wherein each of the plurality of pipe cylinders includes:

a plurality of cylinder tubes having a predetermined length and coupled to the plurality of pipe connectors; and at least one cylinder grid configured to connect two of the plurality of cylinder tubes to each other.

12. The battery module according to claim 1, wherein the at least one flame leak prevention partition has telescoping sections.

13. The battery module according to claim 1, wherein the exhaust housing includes:

a housing base configured to cover an upper side of the module case, the housing base having the at least one gas discharge hole; and a housing cover configured to cover the housing base, the housing cover having an exhaust hole.

14. The battery module according to claim 13, further comprising a pipe between the housing base and housing cover, the pipe extending from the at least one gas discharge hole to the exhaust hole.

15. The battery module according to claim 1, wherein the exhaust housing incudes a housing cover configured to be coupled to the housing base, wherein the at least one flame leak prevention partition extends in the space between the housing base and housing cover.

16. The battery module according to claim 1, wherein the at least one flame leak prevention partition comprises a plurality of flame leak prevention partitions.

17. The battery module according to claim 1, wherein the exhaust housing includes a pipe unit having a first end connected to the at least one gas discharge hole.

18. The battery module according to claim 17, further comprising a housing cover having an exhaust hole, wherein the pipe unit has a second end connected to the exhaust hole.

19. A battery pack, comprising:

at least one battery module as defined in claim 1; and a pack case configured to package the at least one battery module.

20. A vehicle, comprising at least one battery pack as defined in claim 19.

* * * * *